(12) United States Patent
Niesen et al.

(10) Patent No.: US 6,437,742 B1
(45) Date of Patent: Aug. 20, 2002

(54) ROTATING DOPPLER RECEIVER

(75) Inventors: Joseph W. Niesen, La Mirada; Gerald J. Stiles, El Segundo, both of CA (US)

(73) Assignee: TRW Inc., Redondo Beach, CA (US)

(*) Notice: Subject to any disclaimer, the term of this patent is extended or adjusted under 35 U.S.C. 154(b) by 0 days.

(21) Appl. No.: 09/698,734

(22) Filed: Oct. 27, 2000

(51) Int. Cl.[7] ................................................. G01S 3/52
(52) U.S. Cl. ........................................................ 342/418
(58) Field of Search ................................ 342/418, 430, 342/449, 107, 113; 343/708

(56) References Cited

U.S. PATENT DOCUMENTS

| | | | | |
|---|---|---|---|---|
| 3,065,463 A | * | 11/1962 | Turner | 342/107 |
| 3,550,130 A | * | 12/1970 | Shaw | 342/418 |
| 3,787,862 A | * | 1/1974 | Jacobsen | 342/418 |
| 4,358,768 A | * | 11/1982 | Ernst | 342/429 |

* cited by examiner

*Primary Examiner*—Gregory C. Issing
(74) *Attorney, Agent, or Firm*—Ronald M. Goldman

(57) ABSTRACT

An enhanced Doppler type direction finding system uses two antennas or antenna pairs (1 & 7) that are rotated in two mutually orthogonal circular paths (8 & 13) to intercept incoming RF from an emitting source, whose direction is to be determined.

8 Claims, 4 Drawing Sheets

ROTATING DOPPLER RECEIVER

FIELD OF THE INVENTION

The present invention relates to a Doppler type radio direction finder through which the direction of a remote source of RF emissions may be determined and, more specifically, to an improved aircraft borne direction finder or to a ground based Doppler direction finder of a stationary RF emitting source, irrespective of the orientation and position relative to the emitting RF source.

BACKGROUND

A Doppler direction finder is one which uses the relative motion between RF source and emitter to create a Doppler shift in received RF frequency to determine the direction of the RF source to the receiving antenna. The movement of the receiving antenna may be actual, for example, as by mechanical rotation of a boom or propeller that carries an antenna at the end of the respective boom or propeller, or if there is relative motion between the emitting RF source and the receiver, the antenna movement may be simulated by sequentially scanning or commutating an array of fixed antennas forming a closed loop. The motion of the receiving antenna normal to the approaching wavefronts of the emitting RF source impresses a shift in the apparent frequency of the incoming RF signal, the Doppler shift. When the antenna is approaching the RF source, the Doppler shift is positive, resulting in an increase in the frequency of the received signal, and while receding therefrom, the received signal frequency decreases to less than the actual frequency of the remote RF source.

Assuming constant angular velocity during the direction finding measurement, the magnitude of rotation of the receiving antenna relative to the phase of the resulting Doppler frequency shifts is a measure of the bearing or azimuth of the incoming RF. The maximum Doppler frequency shifts in each direction occurs when the antenna velocity toward or away from the signal source is a maximum; a positive maximum when moving directly toward the source of RF emissions, and a negative maximum when moving directly away. When the tangential antenna velocity is at right angles to the line connecting the RF source and the receiving antenna, the Doppler frequency shift will be zero. For example, if an antenna is rotated about a circular path in a horizontal plane at a constant speed, a maximum instantaneous frequency of the Doppler modulation occurs at the point at which the direction of propagation of the incoming RF is tangent to the circular path of the antenna, and the points of zero Doppler shift occur 90 degrees away from such maximum, where the direction of incident RF propagation is along a diameter of the foregoing circular path of rotation. The change in frequency is the product of maximum Doppler shift and a sinusoid due to the changing projection of the antenna velocity vector onto the line connecting the antenna and the RF emitting source.

Using those signals, prior Doppler direction finders display the azimuth of the moving RF source, as one example, by monitoring the phase of the Doppler shifted signal by synchronizing rotation of the deflection coil of a cathode ray tube with the rotation of the antenna. With the center of the cathode ray tube taken as the center of rotation and the vertical (or horizontal) calibrated to the zero azimuth position of the rotating antenna, the angle formed between a line drawn through the spot illuminated on phosphor of the cathode ray tube faceplate by the electron beam of the CRT, drawn to the center of the CRT and the vertical (or, alternately, horizontal) represents the azimuth of the source relative to the base angle of the receiving antenna.

It should be appreciated also that the maximum frequency deviation of the Doppler signal obtained depends upon the orientation of the emitting source that is being observed relative to the geometric plane of rotation of the antenna. If the RF is propagating in the same plane as the rotating antenna, the propagation vector of the emitted RF is entirely horizontal, and hence yields the maximum frequency deviation of Doppler signal at the Doppler system antenna. The foregoing occurs, as example, where the direction finder is installed in a helicopter flying at a certain height, and the antenna of the direction finder is located at an end of (and rotated in a circle by) the helicopter's main rotor, defining the plane of rotation, and the source of RF emissions is an aircraft flying at that same height directly toward the helicopter. Alternatively if the aircraft is flying in parallel with the helicopter, a maximum frequency deviation will also be obtained, although the extent of that deviation will be less than in the former example.

If, however, the source aircraft is flying at a much greater height than the helicopter, the effective RF acted upon by the rotating antenna of the finder is only the horizontal component of the propagating RF, which has a smaller projection onto the RF propagation vector than the RF propagation vector. Hence, the Doppler shift derived is much less than before, although still sinusoidal with rotation and reaching smaller maxima of frequency shifts. And if the aircraft is flying directly overhead of the finder's rotating antenna, the propagation vector is entirely vertical, zero degrees relative to the circular rotation path of the antenna, the horizontal component of that incoming RF is zero, and, hence, the maximum frequency deviation is zero, and no Doppler shift is observed. The foregoing variation in frequency deviation, thus, has been used to provide an indication of the elevation of the emitting source, simultaneously with an indication of the source azimuth.

Considering again the foregoing Cathode Ray Tube display, the greater the magnitude of the Doppler shifted signal, the greater the current produced in the rotating electromagnetic deflection coil of the CRT. That greater current produces a greater deflection of the electron beam, moving the illuminated spot a greater distance radially from the center. Thus the distance of the spot from the center in that direction finder system is a measure of the elevation of the RF emitting source, while the azimuthal position of the spot on the face of the CRT is a measure of the azimuth of that source. Such a direction finding system is described, as example, in U.S. Pat. No. 3,329,955 to Beukers et al, granted Jul. 4, 1967.

Another proposed Doppler direction finding system employs two antennas located at diametrically spaced positions about the axis of rotation, and combines the antenna outputs to achieve an enhanced signal. This is illustrated in U.S. Pat. No. 3,386,097 to Richter et al.

It is appreciated that an aircraft in which the foregoing Doppler radio direction finder may be installed, as example, does not always fly at a fixed horizontal attitude. Sometimes the aircraft may turn and bank, as example, and the plane of rotation of the rotating antenna, accordingly, will sometimes tilt from the horizontal (or vertical). Should the pilot of the observing aircraft make or be running a check for a source of RF emissions while the pilot's craft is in a banked position, the emitting source may be undetectable if by chance, the emitting source is on another aircraft traveling vertically overhead of the plane of rotation of the Doppler antenna, as tilted, or if the relative horizontal component of emitted RF of that source is too small for the direction finder to meaningfully detect when the observing craft is banked.

None of the prior direction systems address the need to take a reading while the inspecting aircraft is banking. All such systems appear to rely upon the pilot of the craft maintaining the aircraft oriented with the circular path of the receiving antenna oriented in a plane parallel to the surface of the Earth. As becomes apparent, as an advantage, the present invention offers a solution to that problem.

The principal object of the present invention, therefore, is to enhance the effectiveness of Doppler direction finder systems.

And a further object is to minimize the effect of the relative orientation of the emitting source upon a Doppler direction finding system detection.

SUMMARY

In accordance with the foregoing objects and advantages, the invention provides two antennas (or antenna pairs) that are rotated in two mutually orthogonal circular paths to intercept incoming RF from an emitting source, whose direction and/or elevation is to be determined. The antennas or antenna pairs are rotated about orthogonal axes at identical rotational velocities and in phase. The antennas thereby intercept propagating RF arriving from any direction.

Taking an extreme case as example, if the emitting source is directly overhead or below the center of the rotational plane of the one antenna (or antenna pair), as would result in no Doppler signal, the emitting source lies in the plane of rotation of the other antenna (or antenna pair), and would thereby result in maximum frequency of the Doppler signal. If the Doppler system is carried on an aircraft, as further example, and the aircraft is banking and, hence, might orient one antenna (or antenna pair) in a direction as results in minimal derived Doppler signal, the other antenna (or antenna pair) is simultaneously oriented to obtain maximal derived Doppler shift signal from the emission source. Alternatively, the two antennas (or antenna pairs) are used to respectively determine direction and elevation of the remote source of emissions.

In accordance with an additional feature of the invention, the received RF is processed digitally by electronic apparatus carried upon the propeller or other rotating arm that spins the antenna and the Doppler information is transmitted from that propeller as modulated RF to a receiver, demodulator and digital display unit located in a stationary position within the aircraft.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENTS

Figure 1:
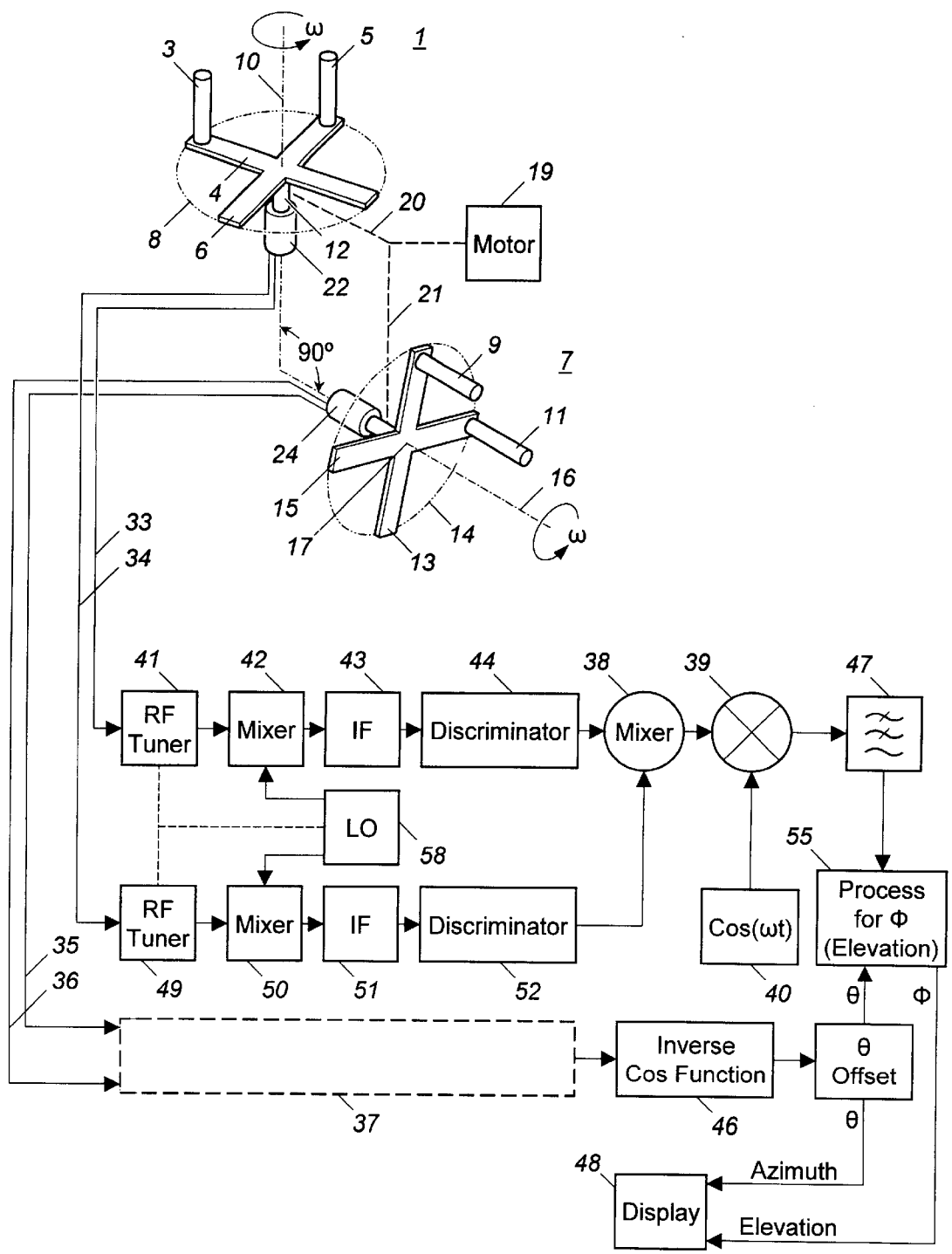
FIG. 1 illustrates an embodiment of the invention.

In FIG. 1, which illustrates an embodiment of the invention partially in pictorial form and partially in schematic form, numeral 1 represents one rotational array of two antennas 3 and 5, an antenna pair; and numeral 7 represents a second rotational array two antennas 9 and 11. Antennas 3 and 5 are identical in structure. They are mounted by rigid arms, spokes, or, as variously termed, propellers 4 and 6, respectively, each of which extends across the diameter of a defined circle 8, represented in dash lines, and through the axis 10 of that circle. Antenna 3 is mounted at the distal end of propeller 4 and antenna 5 is mounted at the distal end of the second propeller 6. In this embodiment the two propellers are oriented and fixed at a 90 degree angle to one another. Each of the two propellers is connected at its center to hub and shaft 12, represented in dash lines, through which the two antennas may be moved about in a circular path 8, and rotate about the rotation axis 10 of the propellers.

The second rotating antenna array 7 is constructed identical to the first. Antennas 9 and 11 are identical in structure to each other and to the antennas of the first array. The latter antennas are mounted to the respective ends of two additional rigid propellers 13 and 15, each of which extends across the diameter of a defined circle 14 and through the axis 16 of that circle, represented in dash lines. The two propellers are also fixed in orientation at 90 degrees to one another. Each of the two propellers is connected at its center to hub and shaft 17, represented in dash lines, through which the two antennas may be moved about circular path 13 in tandem, spaced by 90 degrees, and rotated about axis 16. Counterweights, not illustrated, may be attached to the free end of each propeller, diametrically opposed to the end carrying an respective antenna, if found necessary to offset the weight of the antenna and ensure proper mechanical balance during rotation of the antenna arrays.

The axis 10 of the first antenna array, hence shaft 12, is oriented perpendicular to the corresponding axis 16, and shaft 17, of the second antenna array. For operation, antennas 3 and 5 are rotated about axis 10 about circular path 8, the latter circle lying in the x-z plane represented in the figure. The x-z plane may be, as example, a rotational plane horizontal to the Earth, assuming the system is being carried on an aircraft traveling horizontal to the Earth. Antennas 9 and 11 are rotated about axis 16 and travel about circular path 13, the latter defined circle lying in the y-z plane, which is orthogonal to the x-z plane. The y-z plane may be, in furtherance of the preceding example, a plane oriented vertical to the Earth.

An electric motor 19 is linked by appropriate gears and shafts, represented by the dash lines 20 and 21, to the respective shafts 12 and 17 of the two antenna arrays. The mechanical linkage, if desired, may be such that the two antennas have a fixed time invariant phase offset. That is, when antenna 3 in the first array is at a zero azimuth position, then the corresponding antenna 9 of the second array is at a fixed offset to the zero azimuth position for the respective antenna.

In operation, motor 19 rotates the respective shafts 12 and 17, and, hence, rotates the two arrays in unison, rotating the antennas at the same rotational speed,ω, and in the same clockwise (or alternately contra-clockwise) direction. The arrays rotate in unison and at the same rotational frequency, one rotating, say in the horizontal plane, like a Merry-Go-Round, while the other simultaneously rotates in the vertical plane, like a Ferris Wheel. Alternative motor mechanisms may be employed, as example, by having a separate motor for each antenna array, with the motors designed to rotate at an identical rpm and appropriate circuitry to synchronize that rotation.

To couple RF signals received at the antenna and output those signals to associated electronic circuitry, which is not rotating, but stationary in relative position, antenna feed leads, not illustrated, are strung from the respective antennas along the respective propellers to the central hub and shaft, and respective electrical commutators or slip rings, which in this embodiment may be of conventional structure, are connected between the output end of those leads and the output to the electronic circuitry. The two commutators or slip ring assemblies for antennas 3 and 5 is illustrated by block 22; that for antennas 9 and 11 by block 24. Each commutator or slip ring assemblies rotates with associated rotating shaft to provide a continuous electrical path for the electrical signals received over the antenna feed leads, which are rotating, to the stationary pair of electrical leads that connect to the electronic circuits, schematically illustrated.

Figure 2:
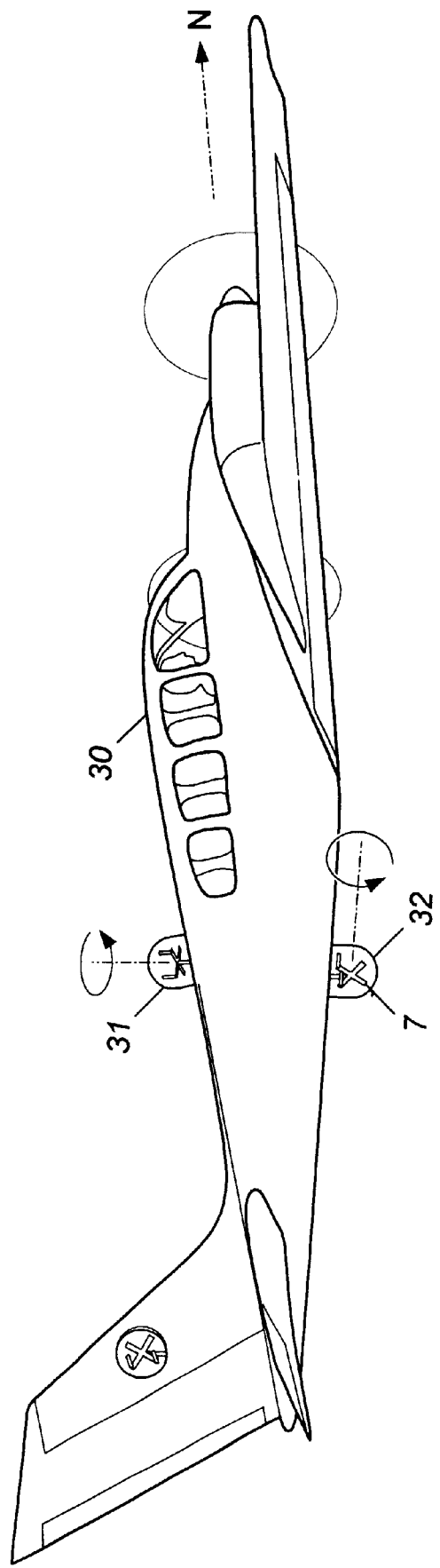
FIG. 2 pictorially illustrates an application of the foregoing embodiment in a fixed wing airplane.

Turning briefly to FIG. 2, which pictorially illustrates, not-to-scale, a fixed wing aircraft 30 and the mounting of the foregoing antenna arrays 1 and 7 to that aircraft. Each of the arrays is mounted to an appropriate location on the fuselage of the aircraft or airfoil in a manner and position as not to materially adversely affect the airworthiness of the craft. Preferably, those antenna arrays are mounted inside the familiar radar-type domes, 31 and 32, respectively, which are pervious to RF radiation, to provide a more friendly environment for the rotating arrays and smooth exterior surfaces for the aircraft. It should be realized that at the higher microwave frequencies (and shorter wavelengths) typically used in aircraft at the present day, a quarter-wave antenna may be physically quite small. A quarter-wave antenna can be used when the exact RF carrier frequency of the emitter is known. Compact broadband antenna design, such as the planar log periodic antenna, can be used when the RF emitter carrier frequency is known to be in a particular RF band. Since the aircraft is intended to be used for electronic eavesdropping, if desired, the aircraft need not possess the maneuverability and speed of a modern fighter airplane.

It is appreciated that the axis of the aircraft represents an artificial North direction in the foregoing description, and that the bearing obtained through use of the foregoing system is the bearing of the radiation source relative to the axis of the aircraft. Of course that bearing may be related to true North through use of additional electronic equipment, not illustrated. As example, through use of the bearing determining gyroscopes normally carried on board aircraft, a signal may be obtained that is used to provide a base reading relative to true North. The signal obtained with the invention may then be combined with that supplied by the gyroscopes to provide a directional display that relates to true North.

Returning to FIG. 1, slip ring assembly 22 provides two outputs 33 and 34, one from each antenna in antenna pair 1. Slip ring assembly 24 also provides two outputs 35 and 36, one for each antenna in array 7. Various electronic circuits either analog or digital may be used to process the received RF and obtain the desired information. That illustrated in this figure are recognized as partially analog circuits, which are known, and serve to illustrate the broad scope to the present invention. The novel digital processing system, later herein described in greater detail as an improvement to the invention, however, is the preferred form of implementing the invention.

Continuing with FIG. 1, the outputs 33 and 34 separately extend the signals from antennas 3 and 5 of the first rotating antenna system 1, respectively, via slip ring assembly 22 to the respective dual inputs of a first signal processing circuit at RF tuners 41 and 49, respectively. The outputs 35 and 36 separately extend the signals from antennas 9 and 11 of the second rotating antenna system 7 to the respective inputs of a second signal processing circuit 37, illustrated by a block drawn in dash lines.

Each signal processing circuit contains two channels, one for each antenna of the in the rotating array. The first channel of the first signal processing circuit contains RF tuner 41, mixer 42, which serves as the IF converter, IF amplifier 51 and frequency discriminator 44. The second channel is identical, and contains RF tuner 49, mixer 50 and IF amplifier 51 and frequency discriminator 52. Local oscillator 58 is connected to both mixers 42 and 50. The two RF tuners and the local oscillator are gang-tune as indicated by the linkage, illustrated in dash lines. The two RF tuners are both tuned to the frequency of the RF signal received from the remote source, the direction of which is to be determined.

The local oscillator and the mixers 42 and 50 convert the signals in each channel to respective intermediate frequency ("IF") signals. The latter IF signals are amplified by the respective IF amplifiers and applied to the respective input of frequency discriminators 44 and 52. By design the discriminators have a center frequency of operation that is equal to the IF frequency. The respective outputs of discriminators 44 and 52 will be sinusoidal with a fixed 90 degree phase difference and a frequency,ω, that is the same as the rotational frequency of the antenna arrays. If the direction of the incoming signal changes, the phases of both discriminator outputs 44 and 52 change in unison by the same amount as the change in the incoming signal azimuth, while maintaining the 90 degree phase difference there between. The outputs of the discriminators are applied to respective inputs of mixer 38, which effectively adds the Doppler shift signals to provide a greater magnitude of Doppler shift.

The output of mixer 38 is coupled to an input of mixer 39. In the latter mixer, the combined Doppler shift signal is mixed with the signal from oscillator 40. The latter oscillator provides a time varying cosine signal, cos (ct), of a frequency e), equal to the rotation speed (in revolutions per second) of antenna system 1. As later herein discussed in connection with the theory of operation, one of the signals available at the output of mixer 39 is of the form cos (φ)−sin(φ) sin (θ). That signal is extracted through low pass filter 47, which is designed to pass that frequency.

Reference is again made to signal processing circuit 37 associated with the second antenna system 7. That processing circuit contains components substantially identical to that of the first processing circuit just described, and those components are connected together in circuit identically, through to the low pass filter, corresponding to low pass filter 47 in the first processing circuit. Therefore, it is not necessary to illustrate circuit 37 in detail.

As hereafter described mathematically in greater detail, the Doppler shift output from the signal processing circuit 37 as a result of the final signal mixing is the form cos (θ), whereθ represents the phase offset. The phase offset is the estimate of the azimuthal angle of the remote emitter. That output is processed by an inverse cosine function circuit 46 to produce the offset value θ. The output of inverse cosine circuit 46 may drive a calibrated position reading on a cathode ray tube or LCD display 48 to produce for viewing the azimuth reading of the emitter's position.

Returning to the first signal processing circuit, the signal output from low pass filter 47, which, as earlier described, is of the form cos(φ)−sin(φ) sin (θ), is applied to processor 55. Processor 55 is also supplied with the phase offset 0, outputted by the second signal processing circuit. With those two pieces of information, processor 55 is able to calculate φ, which is representative of the elevation of the source of emissions. The output of processor 55 may drive a calibrated position reading on a cathode ray tube or LCD display 48 to produce for viewing the elevation reading of the emitter's position.

The display 48 is calibrated both in degrees of azimuth and in degrees of elevation. With the foregoing system installed on the aircraft, the foregoing directions may refer to the axis (and elevation) of the aircraft with the front of the aircraft designated as zero degrees and the elevation designated from the elevation of the axis of the aircraft. That information may be converted to absolute values by factoring in the heading of the airplane and the degrees of tilt thereof relative to earth to provide new numbers more meaningful to an observer standing on the ground.

The foregoing dual rotating antenna Doppler system was described in connection with electronics circuits in which the receiving antennas were physically separated by 90 degrees. Other known Doppler bearing detection schemes that use a rotating antenna array, however, require two antennas of the array to be spaced apart by 180 degrees in which the RF from each antenna is treated separately. It is appreciated the present invention also encompasses a two antenna arrangement in each of two arrays, but in which the outputs from the two antennas are placed in electrical phase and combined. This arrangement produces a larger RF signal output from each array.

Figure 3A:
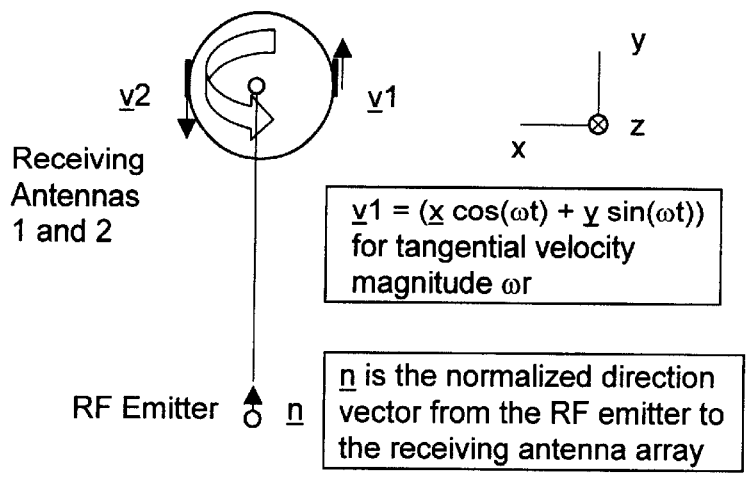
FIGS. 3A and 3B are pictorial illustrations used to assist in describing the physical concepts and theory that underlie the operation of the invention.
Figure 3B:
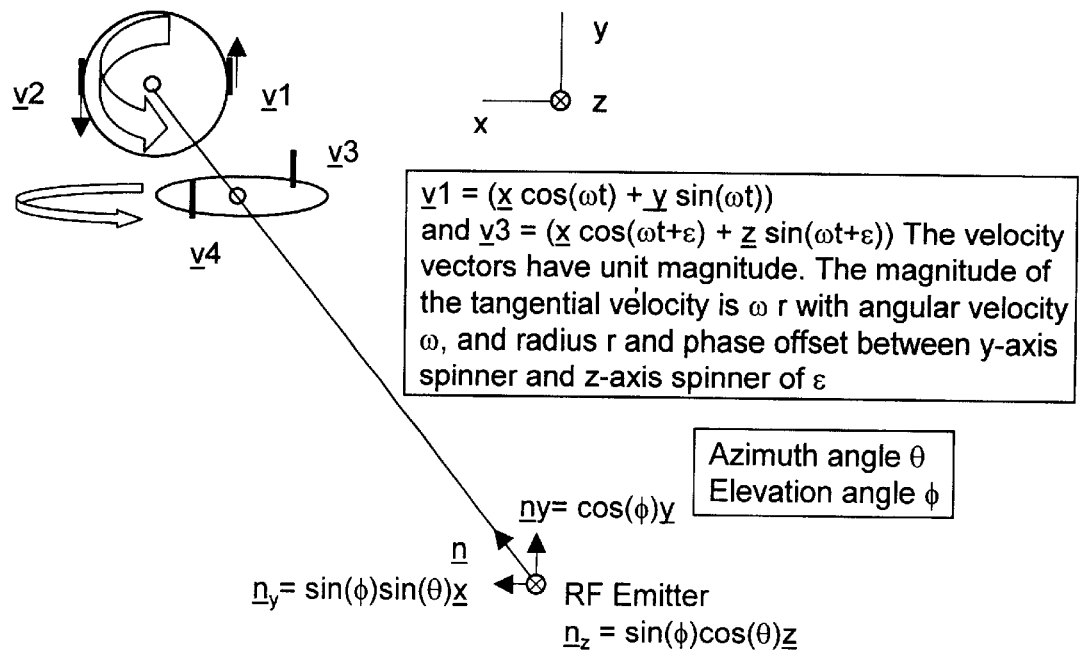

FIGS. 3A and 3B respectively pictorially illustrate a two dimensional direction find system of the prior art and a three dimensional direction finding system of the present invention. For purposes of explanation, the description of the antennas in these figures is given in terms of "antenna 1" and "antenna 2", which correspond to antennas 9 and 11 in FIG. 1; and "antenna 3" and "antenna 4", which correspond to antennas 3 and 5 in FIG. 1. Both systems are represented in vector form. In FIG. 1 the source of emissions is represented by the vector n, the normalized direction vector from the RF emitter to the receiving antenna array. For a tangential velocity of or the velocity of antenna 1 in Cartesian coordinates, v3 is equal to (x cos(ωt)+y sin(ωt)). FIG. 3A is otherwise self-explanatory and provides background to FIG. 3B in which the contents of FIG. 3A is included.

Reference is made to FIG. 3B. In this three dimensional relationship, the vector n to the axis of rotation may be represented by nx +ny +nz, where nx is equal to x sin(φ) sin(θ), ny is equal to y cos(φ) and nz equals z sin(φ)cos(θ), withθ representing the azimuth angle andφ representing the elevation angle. The rotational velocity v3 equals (x cos (ωt)+y sin(ωt)) and the velocity of antenna 1, v1 equals (x cos(ωt+ε) +z sin(ωt+ε)), whereε represents the phase offset between the y-axis spinner and z-axis spinner. The velocity vectors have unit magnitude. The tangential velocity isω ocr with angular velocityω and radius r.

Antennas 1 and 2 generate voltage as a function of time $V_1(t)$ and $V_2(t)$, respectively. Those voltages are affected by the Doppler shift in the emitter's emission frequency, of, which depends on the antenna velocity vectors, $v_1$ and $v_2$, and on the unit vector connecting the source to the receiver, n. From Einstein's special theory of relativity, the coefficient b is the ratio of the magnitude of the tangential antenna velocity (the product of the angular velocity ω and the spin radius r)to the speed of light, b=

$$\frac{\omega r}{c}.$$

The phase of the received signal is also dependent on the relative position of the antenna element with respect to the approaching emitter wavefront. The Doppler component of phase shift varies with b. The maximum in positive phase shift for the wavefront-to-antenna positioning phase term is 90°

$$\left(\text{in time, } \frac{2\pi}{4\omega}\right)$$

ahead of the Doppler phase component. All phase terms are included in equations (1) and (2) to describe the time dependence of received antenna voltages $v_1(t)$ and $v_2(t)$, respectively.

$$V_1(t) = A_1 \cos \left\{ 2\pi f_0 \int_0^t \left(1 - \underline{n} \cdot \underline{v}_1(t) \frac{b}{\sqrt{1-b^2}}\right) dt + \left(2\pi f_0 \frac{r}{c} \underline{n} \cdot \underline{v}_1 \left(t + \frac{2\pi}{4\omega}\right) + \varepsilon\right) \right\} \quad (1)$$

$$V_2(t) = A_2 \cos \left\{ 2\pi f_0 \int_0^t \left(1 - \underline{n} \cdot \underline{v}_2(t) \frac{b}{\sqrt{1-b^2}}\right) dt + \left(2\pi f_0 \frac{r}{c} \underline{n} \cdot \underline{v}_2 \left(t + \frac{2\pi}{4\omega}\right) + \varepsilon\right) \right\} \quad (2)$$

By IF conversion and the time differentiation performed by an IF discriminator, the FM-demodulated outputs of the discriminator for antennas 1 and 2 are $V_{1FM}(t)$ and $V_{2FM}(t)$ as expressed in equations 3 and 4, respectively. Using the fact b<<1, then $$\frac{b}{\sqrt{1-b^2}} \sim b.$$

$$V_{1FM}(t) = \frac{f_0 \omega r}{c} \underline{n} \cdot \underline{v}_1(t) + \frac{f_0 \omega r}{c} \frac{d}{dt}\left(\underline{n} \cdot \underline{v}_1\left(t + \frac{2\pi}{4\omega}\right)\right) \quad (3)$$

$$= \frac{2f_0 \omega r}{c} \sin(\phi)\underline{n} \cdot \underline{v}_1(t) = \frac{2f_0 \omega r}{c} \sin(\phi)\sin(\omega t + \varepsilon + \theta)$$

$$V_{2FM}(t) = \frac{2f_0 \omega r}{c} \sin(\phi)\underline{n} \cdot \underline{v}_1\left(t + \frac{\pi}{\omega}\right) = \frac{-2f_0 \omega r}{c} \sin(\phi)\sin(\omega t + \varepsilon + \theta) \quad (4)$$

By differencing the balanced FM discriminator outputs as shown in FIG. 1, the sine waveform in equation (5) is produced.

$$\frac{4f_0 \omega r}{c} \sin(\phi)\sin(\omega t + \varepsilon + \theta) \quad (5)$$

This waveform is input to a phase locked loop or other phase recovery circuit to recover the azimuth angle θ. For example of the phase recovery process, this waveform is then input to a mixer (that uses a mixing voltage derived from the rotating platform as a reference), a low pass filter and inverse cosine function to directly produce the phase offset, θ, as output. The phase offset, θ, is the estimate of the emitter's azimuthal angle. A voltage output proportional to phase offset, θ, is then used to drive a calibrated position reading on a CRT or LCD display, and produce an azimuth reading of the emitter's position.

For the antennas 3 and 4, the antenna output voltages are included in equations (6) and (7), respectively.

$$V_3(t) = A_3 \cos \left\{ 2\pi f_0 \int_0^t \left(1 - \underline{n} \cdot \underline{v}_3(t) \frac{b}{\sqrt{1-b^2}}\right) dt + \left(2\pi f_0 \frac{r}{c} \underline{n} \cdot \underline{v}_3 \left(t + \frac{2\pi}{4\omega}\right) + \varepsilon\right)\right\} \quad (6)$$

$$V_4(t) = A_4 \cos \left\{ 2\pi f_0 \int_0^t \left(1 - \underline{n} \cdot \underline{v}_4(t) \frac{b}{\sqrt{1-b^2}}\right) dt + \left(2\pi f_0 \frac{r}{c} \underline{n} \cdot \underline{v}_4 \left(t + \frac{2\pi}{4\omega}\right) + \varepsilon\right)\right\} \quad (7)$$

The balanced FM discrimination and differencing is performed as was done for the signals processed from antennas 1 and 2.

The output of the low pass filter is processed to produce the elevation angle, φ, where the low pass filter output is $\cos(\phi) - \sin(\theta) \sin(\phi)$, and $\sin(\theta)$ is known from the azimuth angle processing and calculations earlier described.

Figure 4:
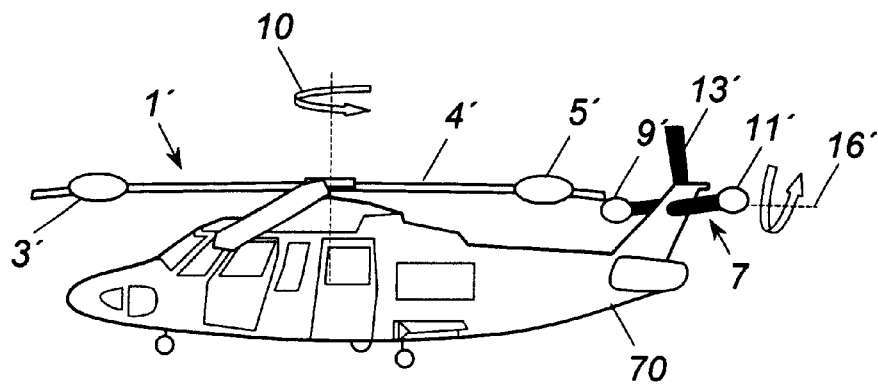
FIG. 4 pictorially illustrates a modified form of the embodiment of FIG. 1 on board a rotating wing aircraft.

FIG. 4 pictorially illustrates an alternative pair of rotating antenna arrays 1' and 7' for a Doppler direction finding system, supported for operation on a helicopter 70. The two antennas in each array (or antenna pair) are located at opposite ends of the respective rotors of the helicopter, spacing them 180 degrees apart; and eliminating one of the arms used in the prior embodiment. Thus, in the first array 1', antennas 3' and 5' are located at opposite ends of the main rotor 4'; and in the second array 7', the two antennas 9' and 11' are located at opposite ends of tail rotor 13' of the helicopter. Mechanically and electrically all the antennas and the arrays are identical.

As in the prior embodiment the axis of rotation 10' of antenna array 1' is orthogonal to the axis of rotation 16' of the other antenna array 7'. The propellers are rotatably driven in synchronism and in azimuthal phase by the engine that drives the rotors, not illustrated, maintaining the antenna rotation of the two arrays in positional synchronism. However, with the antennas of a pair displaced by one-hundred and eighty degrees, the Doppler shift occurring will be double that obtained with the antennas in an array being spaced by ninety degrees as in the embodiment of FIG. 1.

In this embodiment the two antennas within an array are spaced by one-hundred and eighty degrees along an arc of the circular path. Thus as one antenna within an array, such as antenna 3' obtains a maximal Doppler signal from the RF that is received from the source as the antenna rotates toward the source, the maximum frequency increase, the companion antenna 5' should be receiving the minimal Doppler signal from that source, the maximum frequency decrease, since the latter antenna is receding from the remote RF source. Essentially the RF envelope produced by the one antenna is a sinusoidal curve that is one-hundred and eighty degrees out of phase with a sinusoidal curve produced by the other antenna of the pair during the course of the antennas rotation about the circular path. By shifting the phase of the one signal by 180 degrees and combining it with the other, assuming the phase shift circuit in the frequency range of interest is essentially frequency independent, a larger magnitude Doppler component of the RF signal is obtained.

As in the prior embodiment the axis of rotation 10' of antenna array 1' is orthogonal to the axis of rotation 16' of the other antenna array 7'. The propellers are rotatably driven in synchronism and in azimuthal phase by the engine that drives the rotors, not illustrated, maintaining the antenna rotation of the two arrays in positional synchronism. However, with the antennas of a pair displaced by one-hundred and eighty degrees, the Doppler shift occurring will be double that obtained with the antennas in an array being spaced by ninety degrees as in the embodiment of FIG. 1.

In this embodiment the two antennas within an array are spaced by one-hundred and eighty degrees along an arc of the circular path. Thus as one antenna within an array, such as antenna 3' obtains a maximal Doppler signal from the RF that is received from the source as the antenna rotates toward the source, the maximum frequency increase, the companion antenna 5' should be receiving the minimal Doppler signal from that source, the maximum frequency decrease, since the latter antenna is receding from the remote RF source. Essentially the RF envelope produced by the one antenna is a sinusoidal curve that is one-hundred and eighty degrees out of phase with a sinusoidal curve produced by the other antenna of the pair during the course of the antennas rotation about the circular path. By shifting the phase of the one signal by 180 degrees and combining it with the other, assuming the phase shift circuit in the frequency range of interest is essentially frequency independent, a larger magnitude Doppler component of the RF signal is obtained.

Figure 5A:
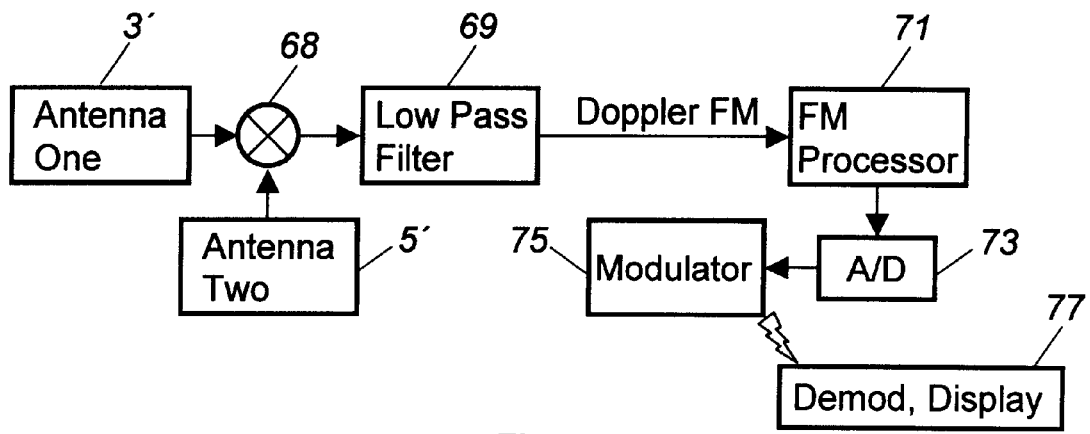
FIGS. 5A and 5B are block diagrams of a digital signal processing system using to determine azimuth and elevation, respectively, of the Doppler direction finding system employed in FIG. 3.
Figure 5B:
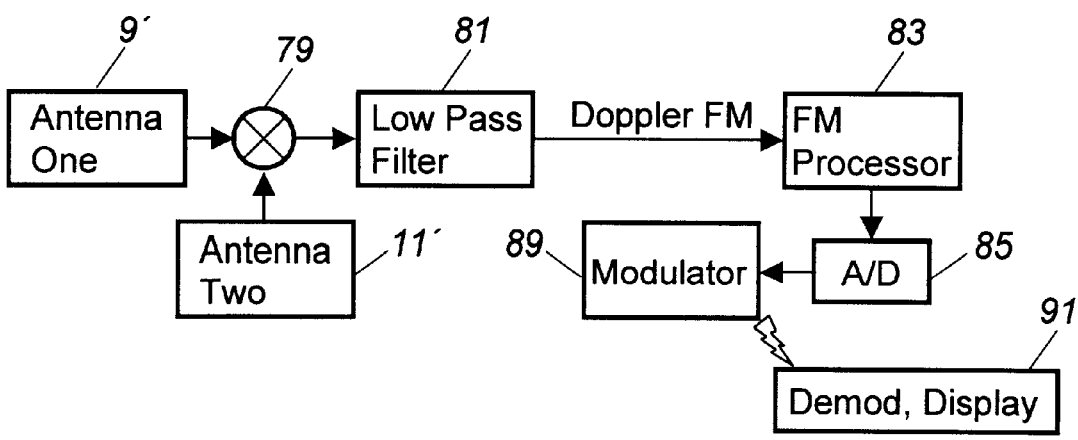

Reference is made to FIGS. 5A and 5B which are block diagrams of the direction finding system, including the digital electronics preferably used with the helicopter of FIG. 4. Considering FIG. 5A, the RF output of each receiving antenna 3' and 5' on the main rotor is output to a mixer 68 which combines and mixes the two signals to produce a difference signal representing the Doppler shift from the base frequency. As earlier described, the instantaneous frequency varies with the position of the propeller relative to the incident RF from the remote source, and changes sinusoidally, effectively producing an FM (frequency modulated) signal. The mixer outputs the mixed signals, including the derived Doppler FM signal into a low pass filter, which passes only the Doppler frequencies. That output is applied to an FM processor 71, and the output of that processor is output to an analog-to-digital converter 73, which produces a digital representation of the instantaneous frequency. The digital signal modulates the RF of a modulated RF transmitter 75. The foregoing electronic apparatus is carried on the rotor along with the antenna. That electronic apparatus is electrically powered by batteries, not illustrated, or that apparatus may be electrically powered from the helicopter in any other conventional way, including, as example, a slip ring connection through the rotor hub.

An RF receiver, demodulator and display 77 is carried within the helicopter, and, hence, is stationary in position relative to the helicopter which serves as a platform, and stationary relative to the rotating rotors of the helicopter. Apparatus 77 is tuned to receive the RF emitted by modulated transmitter 75. The unit demodulates the signal to determine the instantaneous frequency, while simultaneously tracking the angular position of the helicopter's rotor, processes the received signals to determine during each full revolution of the rotor the maximum shift of frequency and the corresponding angle of the rotor. The angular position of the rotor at the position at which the frequency shift is a maximum represents the direction of the remote source of RF emissions relative to the helicopter. That angular direction is then displayed on digital display 77.

As illustrated in FIG. 5B, the two antennas 9' and 11' carried on opposite ends of the tail rotor are associated with like electronic apparatus for determining the elevation of the remote source of emissions. This apparatus includes mixer 79, low pass filter 81, FM processor 83, analog-to-digital converter 85, and modulated RF transmitter 89, which are carried on the tail rotor with the antennas. It further includes an RF receiver, demodulator and display 91 that is carried within the helicopter, and, hence, is stationary in position relative to the helicopter which serves as a platform, and stationary relative to the rotating rotors of the helicopter. Apparatus 91 is tuned to receive the RF emitted by modulated transmitter 89. The RF receiver, demodulator and display 91 functions in the same manner as the corresponding unit 77, which need not be repeated. However, since the Doppler signal from the two antennas represents the elevation of the RF source, unit 91 produces a digital display of the angular elevation of the remote source of RF emissions. The foregoing detection apparatus may be carried on the blades of the respective rotors within pods, which are conventional in structure.

Although the invention was described in connection with an installation on aircraft, those skilled in the art recognize that the same principles apply to land based vehicles and even to stationary systems. The only requirement for operation of the direction finding systems is that the two antennas (or antenna arrays) are rotated in the manner described, and that rotation may be accomplished on a land based vehicle and on a fixed platform or station.

The present invention is believed to have wide application. As those skilled in the art recognize, digital and RF components have been miniaturized in size while the wavelengths used by military aircraft and vehicles has been considerably reduced, allowing physically small sized antennas to be used. Thus the preferred system may be implemented in ground based gyroscopes, such as those four inch diameter, 15,000 revolutions per minute gyroscopes, as example, that are passively looking for RF emissions or that are used with an active radar, such as a CW radar system. And those ground based gyroscopes may be located at a stationary position or be located within a moving vehicle.

It is believed that the foregoing system may be used to locate low level RF sources or presently difficult to locate emitters that are slow moving, such as mobile handsets or attack vehicles.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A Doppler direction finding system for determining the relative azimuth and elevation of a source of RF emissions, comprising:
    a first pair of antennas for receiving incident RF;
    a first rotatable mounting, said first rotatable mounting having a center of rotation about a first axis;
    each of said antennas in said first pair of antennas being mounted to said first rotatable mounting for rotation in a circle centered about said center of rotation of said first rotatable mounting;
    a second pair of antennas for receiving incident RF;
    a second rotatable mounting, said second rotatable mounting having a center of rotation about a second axis, said second axis being oriented orthogonal to said first axis;
    each of said antennas in said second pair of antennas being mounted to said second rotatable mounting for rotation in a circle centered about said center of rotation of said second rotatable mounting;
    motor means for rotating said first rotatable mounting about said center of rotation at a predetermined angular speed and for rotating said second rotatable mounting about said center of rotation of said second rotatable mounting at said predetermined angular speed, whereby said antennas in said first pair continuously move in a circular path to impose a Doppler shift on external RF incident on said antennas, said Doppler shift produced at one of said antennas of said first pair being out of phase with that Doppler shift produced at the other of said antennas of said first pair of antennas and said antennas in said second pair continuously move in a circular path to impose a Doppler shift on RF received by said antennas of said second pair, said Doppler shift produced at one of said antennas of said second pair of antennas also being out of phase with that Doppler shift produced at the other of said antennas of said second pair of antennas; and whereby a Doppler shift is produced irrespective of the orientation of said first and second axes relative to the position of the source of said incident RF.

2. The invention as defined in claim 1, further comprising:
    a first circuit for combining the outputs of said antennas of said first pair of antennas to produce an enhanced Doppler shifted RF output;
    a second circuit for combining the outputs of said antennas of said second pair of antennas to produce an enhanced Doppler shifted RF output; and
    a first mixer for mixing said enhanced Doppler shifted RF output of said first circuit with a time variant cosine of a frequency equal to the rotational frequency of said first pair of antennas; and
    a second mixer for mixing said enhanced Doppler shifted RF output of said second circuit with a time variant cosine of a frequency equal to the rotational frequency of said first pair of antennas.

3. The invention as defined in claim 2, further comprising:
    first low pass filter means coupled to the output of one of said mixers for extracting a signal defining an azimuth angle;
    second low pass filter means coupled to the output of the other one of said mixers for extracting a signal that is a trigonometric function of both said azimuth angle and the angle of elevation of said source of RF emissions.

4. The invention as defined in claim 3, further comprising:
    an arc cosine circuit coupled to the output of said first low pass filter means for providing a voltage representative of an azimuth angle;
    processor means coupled to the output of said arc cosine circuit and said second low pass filter means for solving said trigonometric function to derive a voltage representative of said angle of elevation of said source of RF emissions.

5. The invention as defined in claim 4 further comprising:
    display means for displaying said azimuth angle and said elevation angle.

6. An airborne Doppler direction finder for locating the direction of RF emissions from a remote RF source, comprising:

a first antenna for producing a first Doppler signal from a component of RF received from said RF source propagating through space in a first direction perpendicular to said first antenna, whereby the intensity of said first Doppler signal is proportional to said RF component;

a second antenna for producing a second Doppler signal from a component of RF received from said RF source propagating through space in a second direction, said second direction being orthogonal to said first direction, whereby the intensity of said second Doppler signal is proportional to said RF component;

said first and second antennas having identical receiving characteristics, whereby a Doppler signal is produced irrespective of the spatial position of said RF source relative to said first and second antennas; and first and second rotatable hubs;

and wherein said first and second antennas are mounted for rotation in a circle about said first and second rotatable hubs, respectively.

7. An airborne Doppler direction finder for locating the direction of RF emissions from a remote RF source, comprising:

a first antenna for producing a first Doppler signal from a component of RF received from said RF source propagating through space in a first direction perpendicular to said first antenna, whereby the intensity of said first Doppler signal is proportional to said RF component;

a second antenna for producing a second Doppler signal from a component of RF received from said RF source propagating through space in a second direction, said second direction being orthogonal to said first direction, whereby the intensity of said second Doppler signal is proportional to said RF component;

said first and second antennas having identical receiving characteristics, whereby a Doppler signal is produced irrespective of the spatial position of said RF source relative to said first and second antennas; and a first propeller having a central axis, said propeller being mounted for rotation about said central axis;

said first antenna being mounted to one end of said propeller; a second propeller having a central axis, said central axis of said second propeller being oriented orthogonal to said central axis of said first propeller, and said second propeller being mounted for rotation about said central axis of said second propeller; and said second antenna being mounted to one end of said second propeller.

8. The invention as defined in claim 7, further comprising:

a first RF transmitter;

first electronic processing means mounted to said first propeller for receiving RF from said first antenna and processing the Doppler signal within said received RF, digitizing said Doppler signal and modulating said output of said first RF transmitter with said digitized Doppler signal;

said first RF transmitter and said first electronic processing means being carried upon said first propeller; a second RF transmitter;

second electronic processing means mounted to said second propeller for receiving RF from said second antenna and processing the Doppler signal within said received RF, digitizing said Doppler signal and modulating said output of said second RF transmitter with said digitized Doppler signal;

said second RF transmitter and said second electronic processing means being carried upon said second propeller.

* * * * *